(12) United States Patent
Aramaki

(10) Patent No.: US 12,512,735 B2
(45) Date of Patent: Dec. 30, 2025

(54) LAMINATED CORE AND METHOD FOR MANUFACTURING LAMINATED CORE

(71) Applicant: NIPPON STEEL CORPORATION, Tokyo (JP)

(72) Inventor: Takashi Aramaki, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 0 days.

(21) Appl. No.: 19/103,499

(22) PCT Filed: Sep. 8, 2023

(86) PCT No.: PCT/JP2023/032859
§ 371 (c)(1),
(2) Date: Feb. 12, 2025

(87) PCT Pub. No.: WO2024/053732
PCT Pub. Date: Mar. 14, 2024

(65) Prior Publication Data
US 2025/0260296 A1    Aug. 14, 2025

(30) Foreign Application Priority Data
Sep. 8, 2022 (JP) .................................. 2022-143134

(51) Int. Cl.
*H02K 15/0273* (2025.01)
*H02K 1/04* (2006.01)

(52) U.S. Cl.
CPC ........... *H02K 15/0273* (2025.01); *H02K 1/04* (2013.01)

(58) Field of Classification Search
CPC ............................ H02K 15/0273; H02K 1/04
(Continued)

(56) References Cited

U.S. PATENT DOCUMENTS

2017/0117758 A1    4/2017    Nakagawa et al.
2022/0006336 A1    1/2022    Takeda et al.
(Continued)

FOREIGN PATENT DOCUMENTS

DE    102016116473 A1 *  3/2018  ........... H01F 41/005
JP    2002-260910 A     9/2002
(Continued)

*Primary Examiner* — Jose A Gonzalez Quinones
(74) *Attorney, Agent, or Firm* — Birch, Stewart, Kolasch & Birch, LLP

(57) ABSTRACT

A laminated core 10 includes electrical steel sheets 1 and adhesive insulating coatings 2 alternately stacked and has a lamination direction D tensile strength of adhesive bond of 20 MPa or more measured under a 25° C. condition after a complete reaction of each adhesive insulating coating 2. A method for manufacturing a laminated core 10 includes a punching step of punching an electrical steel sheet coated with an adhesive insulating coating 2 to form an electrical steel sheet 1, an accommodating step of stacking and accommodating electrical steel sheets 1 in a die after the punching step, a low-pressure bonding step of heating the electrical steel sheets 1 in the die at a surface temperature of 60° C. or more and 200° C. or less and bonding the adjacent electrical steel sheets 1 by pressurization at 3.0 MPa or less to form a laminated core 10, and a take-out step of taking out the laminated core 10 from the die after the low-pressure bonding step.

8 Claims, 4 Drawing Sheets

(58) Field of Classification Search
USPC .................................. 310/216.004, 216.008
See application file for complete search history.

(56) References Cited

U.S. PATENT DOCUMENTS

| | | | |
|---|---|---|---|
| 2022/0041893 A1 | | 2/2022 | Ha et al. |
| 2022/0130606 A1 | | 4/2022 | Shimobe |
| 2023/0080376 A1 | | 3/2023 | Tanaka et al. |
| 2023/0257621 A1 | * | 8/2023 | Takeda .................... H01F 3/02 523/400 |
| 2023/0340291 A1 | | 10/2023 | Takeda et al. |

FOREIGN PATENT DOCUMENTS

| | | | | |
|---|---|---|---|---|
| JP | 2009005449 A | * | 1/2009 | |
| JP | 2009-297758 A | | 12/2009 | |
| JP | 2010-274625 A | | 12/2010 | |
| JP | 2014-96429 A | | 5/2014 | |
| JP | 2017-216873 A | | 12/2017 | |
| JP | 6594378 B2 | * | 10/2019 | |
| JP | 2020-113647 A | | 7/2020 | |
| JP | 2021-129453 A | | 9/2021 | |
| JP | 2022-888 A | | 1/2022 | |
| JP | 2022-18470 A | | 1/2022 | |
| JP | 2022-513168 A | | 2/2022 | |
| KR | 10-2018-0023471 A | | 3/2018 | |
| TW | 202204540 A | | 2/2022 | |
| TW | 202220345 A | | 5/2022 | |
| WO | WO-2013129598 A1 | * | 9/2013 | ......... C08G 59/3218 |
| WO | WO 2016/017132 A1 | | 2/2016 | |
| WO | WO 2020/129929 A1 | | 6/2020 | |
| WO | WO-2020111742 A2 | * | 6/2020 | ............... B32B 1/00 |
| WO | WO 2021/256533 A1 | | 12/2021 | |

* cited by examiner

FIG. 4

| No. | Example or Comparative Example | Heating temperature | Applied pressure | Temperature rising rate | Temperature rising amount | Holding time | Reheating temperature | 90°C Lamination direction tensile strength |
|---|---|---|---|---|---|---|---|---|
| 1 | Example | 120 | 1.0 | 3.0 | 100 | 20 | No reheating | A |
| 2 | Example | 120 | 1.0 | 3.0 | 100 | 20 | No reheating | A |
| 3 | Comparative Example | 120 | 1.0 | 3.0 | 100 | 20 | No reheating | C |
| 4 | Example | 60 | 1.0 | 3.0 | 40 | 0 | No reheating | B |
| 5 | Example | 200 | 1.0 | 3.0 | 180 | 20 | No reheating | B |
| 6 | Comparative Example | 200 | 1.0 | 3.0 | 180 | 20 | No reheating | C |
| 8 | Example | 120 | 0.0 | 3.0 | 100 | 20 | No reheating | B |
| 9 | Example | 120 | 3.0 | 3.0 | 100 | 20 | No reheating | A |
| 10 | Comparative Example | 120 | 3.0 | 3.0 | 100 | 20 | No reheating | C |
| 11 | Example | 120 | 1.0 | 5.0 | 100 | 20 | No reheating | A |
| 12 | Example | 120 | 1.0 | 0.15 | 100 | 20 | No reheating | B |
| 13 | Example | 120 | 1.0 | 10 | 100 | 20 | No reheating | B |
| 14 | Example | 120 | 1.0 | 0.1 | 100 | 20 | No reheating | B |
| 15 | Example | 120 | 1.0 | 3.0 | 100 | 120 | No reheating | A |
| 16 | Example | 120 | 1.0 | 3.0 | 100 | 200 | No reheating | B |
| 17 | Example | 120 | 1.0 | 3.0 | 100 | 20 | 160 | A |
| 18 | Example | 120 | 1.0 | 3.0 | 100 | 20 | 250 | A | ness and causing a decrease in productivity.

LAMINATED CORE AND METHOD FOR MANUFACTURING LAMINATED CORE

TECHNICAL FIELD

The present invention relates to a laminated core and a method for manufacturing a laminated core. Priority is claimed on Japanese Patent Application No. 2022-143134, filed Sep. 8, 2022, the content of which is incorporated herein by reference.

BACKGROUND ART

In recent years, the movement for reduction of $CO_2$ has been accelerated worldwide, and application of a motor (rotary electric machine, electric motor) that emits no $CO_2$ during driving has been spread in various fields including the field of automobiles. In this movement, motors are required to achieve more power saving and higher output than before.

As a technique of manufacturing a stacked body of a laminated core applied to a motor, fixing by caulking and laser fixing are known. A laminated core manufactured with such a technique of manufacturing a stacked body has iron loss due to conduction from the fixing portion, and thus this iron loss is one cause of hindering power saving and high output. Recently, techniques of manufacturing a stacked body of a laminated core have been developed using adhesives with an emphasis on iron loss reduction.

Techniques of manufacturing a stacked body of a laminated core with an adhesive include a method of applying an adhesive to an electrical steel sheet and then punching the electrical steel sheet, and a method of punching an electrical steel sheet and then applying an adhesive to the electrical steel sheet. An assembly step of stacking adhesively coated electrical steel sheets is performed in a die or out of a die. There are prior art documents related to these techniques as follows.

CITATION LIST

Patent Document

Patent Document 1
Japanese Unexamined Patent Application, First Publication No. 2010-274625
Patent Document 2
Japanese Unexamined Patent Application, First Publication No. 2009-297758
Patent Document 3
Japanese Unexamined Patent Application, First Publication No. 2022-000888
Patent Document 4
Japanese Unexamined Patent Application, First Publication No. 2021-129453

SUMMARY OF INVENTION

Technical Problem

In a technique of stacking adhesively coated electrical steel sheets out of a die (see Patent Document 3 or Patent Document 4), adjacent electrical steel sheets are bonded to each other by heating, at a high temperature, a stacked body obtained by applying a high pressure to a plurality of electrical steel sheets accommodated in a dedicated jig and taking the resulting temporarily fixed stacked body out of the dedicated jig, or by heating a stacked body fixed with a dedicated jig, at a high temperature. As described above, a method for manufacturing a stacked body out of a die includes the steps of fixing with a dedicated jig or taking out from the dedicated jig and is therefore difficult to automate and causes a decrease in productivity.

Unlike a technique of stacking adhesively coated electrical steel sheets out of a die, a technique of stacking adhesively coated electrical steel sheets in a die (see Patent Document 1 or Patent Document 2) does not include a step of taking out a stacked body, and therefore is relatively easy to automate and excellent in productivity. However, in a case where a stacked body formed by bonding by high-temperature heating is not rapidly cooled when conveyed to the next step, temperature fall takes a time as long as 3 to 4 hours to a temperature at which the stacked body is conveyable. In a case where a stacked body is rapidly cooled when conveyed to the next step, a large-scale cooling mechanism is required for rapid cooling according to the size of the stacked body, resulting in an increase in size of the entire manufacturing apparatus including the cooling mechanism. As described above, in a method for manufacturing a stacked body in a die, the manufacture takes time, or the manufacturing apparatus is increased in size, so that the production scale is difficult to increase, thus causing a decrease in productivity.

The present application provides a laminated core that can be manufactured with high production efficiency and a method for manufacturing a laminated core, in consideration of the problems of the known techniques.

Solution to Problem

The gist of the present invention is as follows.

(1) A laminated core according to one aspect of the present invention includes electrical steel sheets and adhesive insulating coatings that are alternately stacked and has a tensile strength of adhesive bond in a lamination direction of 20 MPa or more, and the tensile strength of adhesive bond is measured under a condition of 25° C. after a complete reaction of each of the adhesive insulating coatings.

(2) In (1) described above, an uppermost layer in the electrical steel sheets may have a protrusion protruding in the lamination direction.

(3) A method for manufacturing a laminated core according to one aspect of the present invention is a method for manufacturing a laminated core formed by stacking a plurality of electrical steel sheets, and includes a punching step of punching an electrical steel sheet coated with an adhesive insulating coating to form each of the plurality of electrical steel sheets, an accommodating step of stacking and accommodating the plurality of electrical steel sheets in a die after the punching step, a low-pressure bonding step of heating the plurality of electrical steel sheets in the die to a surface temperature of 60° C. or more and 200° C. or less while the plurality of electrical steel sheets in the die are pressurized at 3.0 MPa or less and bonding the plurality of electrical steel sheets adjacent to each other to form a laminated core, and a take-out step of taking out the laminated core from the die after the low-pressure bonding step.

(4) In (3) described above, the low-pressure bonding step may include a bonding promotion step of heating the plurality of electrical steel sheets to a temperature of 100° C. or more and 160° C. or less at a temperature rising rate of 0.5° C./s or more and 10.0° C./s or less and holding the temperature for a holding time of 20 seconds or more and 120 seconds or less.

(5) In (3) or (4) described above, the method for manufacturing a laminated core may include a reheating step of heating the laminated core to 160° C. or more and 250° C. or less after the take-out step.

(6) In any one of (3) to (5) described above, in the low-pressure bonding step, the plurality of electrical steel sheets in the die may be pressurized at 0.1 MPa or more.

Advantageous Effects of Invention

According to the present invention, it is possible to provide a laminated core that can be manufactured with high production efficiency and a method for manufacturing a laminated core.

BRIEF DESCRIPTION OF DRAWINGS

FIG. 4 is a table showing a relationship among test specimens, test conditions, and test results in a tensile test of adhesive bond.

DESCRIPTION OF EMBODIMENTS

Figure 1:
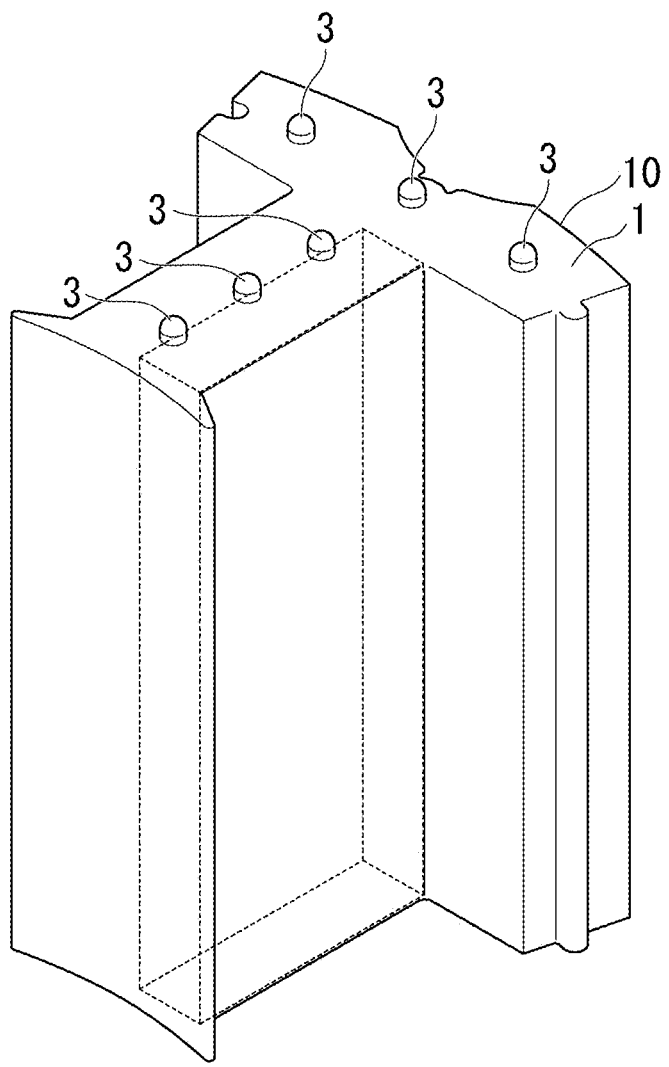
FIG. 1 is a perspective view of a laminated core.

A manufacturing technique of stacking adhesively coated electrical steel sheets in a die is suitable for improving a laminated core in terms of productivity. A manufacturing technique of stacking adhesively coated electrical steel sheets in a die includes a step of heating a stacked body (laminated core) at a high temperature and a cooling step and thus has a problem of increasing the size of manufacturing equipment.

The reason for heating a stacked body at a high temperature is to obtain a necessary strength using a thermosetting adhesive.

For miniaturization or omission of manufacturing equipment, an adhesive is effectively used that has a high strength at the time of completing a stacked body without heating the stacked body at a high temperature.

According to conventional knowledge, a manufacturing technique of a stacked body has been sometimes designed so that a curing reaction of an adhesive used for adhesive coating of an electrical steel sheet is promoted even at a low temperature to complete curing (development of a desired strength) early by setting the glass transition point Tg (temperature at which curing starts from a flexible state) of the adhesive to be low (lowering Tg). However, in the case of a manufacturing technique in which electrical steel sheets are stacked using adhesive coating to manufacture a stacked body, there has been a concern that a curing reaction of an adhesive is promoted due to transportation and storage of the manufactured stacked body, thus causing unintended adhesion between materials called blocking. Therefore, the conventional manufacturing techniques of a stacked body need temperature control, flat pile amount control, and the like, which are eventually obstacles to improvement in production efficiency.

In order to manufacture a stacked body at a low temperature without lowering Tg, a tensile test was performed in which a tensile force was applied to a completed stacked body in the steel sheet lamination direction to examine the relationship of the tensile strength of adhesive bond, which is required for a stacked body to be used in a motor, of the stacked body in the lamination direction (hereinafter, the tensile strength of adhesive bond in the lamination direction may be referred to as the lamination direction tensile strength) and the temperature of the adhesive to the reaction progress state and the strength. The lamination direction tensile strength is an evaluation index independently determined by the present application and is the adhesive bond strength of an entire stacked body in the lamination direction (direction perpendicular to the adhesive bond surface of a stacked sheet with an adhesive) of the stacked body obtained by fixing a plurality of sheets with an adhesive. Specifically, the lamination direction tensile strength is a value obtained by dividing a load at the time of fracture of a stacked body to which a tensile load is applied in the lamination direction by a cross-sectional area of a cross section perpendicular to the lamination direction D of the stacked body (adhesive bond area on one sheet surface of a sheet body included in the stacked body). Examples of the strength measured with a conventional method include the tensile strength of adhesive bonds of JIS K 6849:1994 and the tensile lap-shear strength of JIS K 6850:1999, which are the adhesive bond strength of an adhesive alone. The tensile lap-shear strength is an adhesive bond strength in the case of applying a shear stress parallel to an adhesive bond surface. Here, the necessity of the lamination direction tensile strength defined in the present disclosure and the difference from the conventional strengths will be described.

First, a resin used as an adhesive has a phase orientation (orientation, anisotropy). Therefore, evaluation in a desired direction is performed. However, the shear tensile strength, which is used for evaluating the tensile strength in the direction parallel to an adhesive bond surface, is insufficient in a case where the tension in the lamination direction is required as described above. In tension of a test piece containing a resin, joining and compatibility at the interface between the resin and a steel sheet are important, and the tensile strength of adhesive bonds of JIS K 6849:1994 is insufficient because the strength at the interface cannot be evaluated.

As described above, the lamination direction tensile strength indicates different strength with the conventional strengths. The lamination direction tensile strength found as described above has enabled measurement of the adhesive bond strength of an entire stacked body in the lamination direction as follows.

As a result of examining the relationship of the lamination direction tensile strength and the temperature of an adhesive to the reaction progress state and the strength, the following findings were obtained.

1) The lamination direction tensile strength required for a stacked body to be used in a motor depends on use of the motor. Even in a motor to be used in an electric vehicle (EV), a drone, or a vacuum cleaner, a stacked body used in the motor used at high rotation is required to have a high lamination direction tensile strength, and the required strength is higher than 0.5 MPa, which is the joining strength of a general stacked body by caulking and fixing, and is about 1 MPa.
2) An adhesive cures as the temperature rises in a flow that advances from a flexible state (1), through a reaction promotion state (2), to a reaction completion state (3) (curing mechanism of an adhesive).

With an emphasis on the strength developed in the reaction completion state (3), an adhesive is sometimes designed based on this strength. In contrast, in order to ensure the required strength, if an adhesive is used that can ensure a sufficient strength in (2) as a process of promoting a reaction without waiting for the reaction completion state (3), the required strength can be ensured without heating after (2).

On the basis of such a technical idea, it has been found that if an adhesive is used that has a lamination direction tensile strength as a strength at the time of reaction completion of 20 MPa or more, which is about 20 times the lamination direction tensile strength of about 1 MPa required for a stacked body for a general motor, a sufficient strength can be ensured in the reaction promotion state (2) without waiting for the reaction completion state (3).

First Embodiment

A laminated core 10 according to an embodiment will be described.

Figure 2:
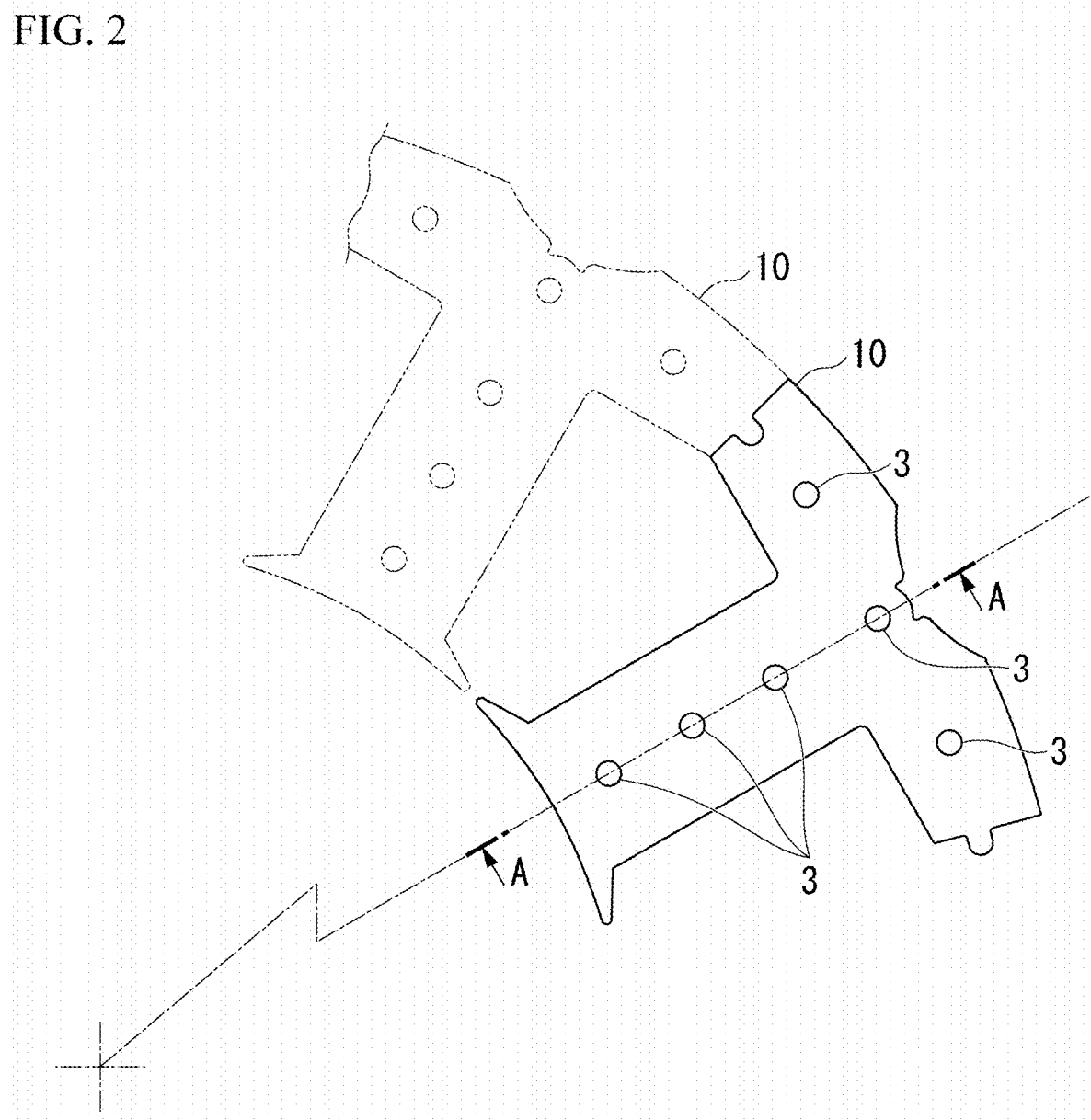
FIG. 2 is a plan view of a laminated core.
Figure 3:
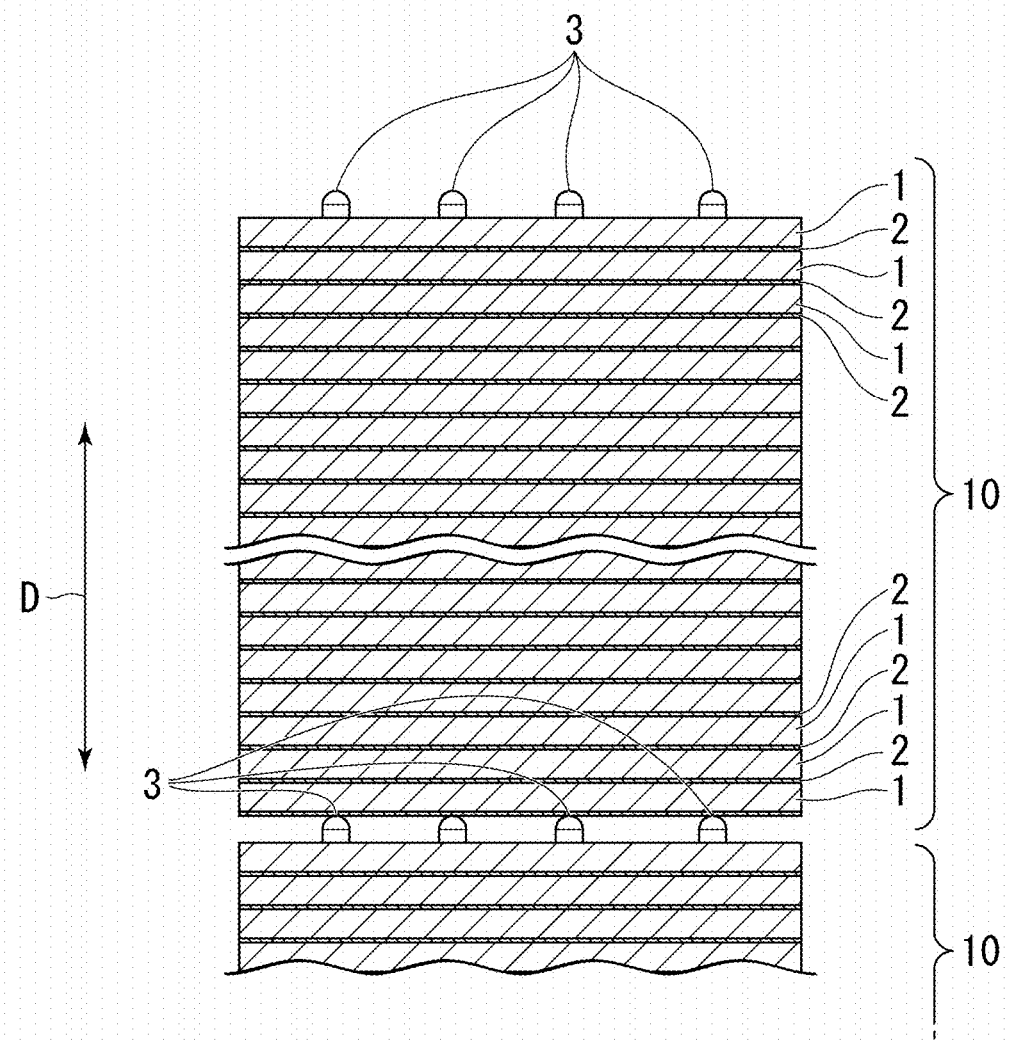
FIG. 3 is a cross-sectional view taken along the line A-A in FIG. 2.

FIG. 1 is a perspective view of the laminated core 10. FIG. 2 is a plan view of the laminated core 10. FIG. 3 is a cross-sectional view taken along the line A-A in FIG. 2.

As illustrated in FIGS. 1 to 3, the laminated core 10 includes electrical steel sheets 1 and adhesive insulating coatings 2 that are alternately stacked in a lamination direction D. The laminated core 10 has a lamination direction tensile strength in the lamination direction D of 20 MPa or more in a case where the lamination direction tensile strength is measured under a condition of 25° C. after a complete reaction of each of the adhesive insulating coatings 2. The lamination direction tensile strength is more preferably 40 MPa or more. Here, the term "complete reaction" means that the curing rate is 100%, or means a state in which a DSC curve obtained by differential scanning calorimetry (DSC) does not include a peak derived from heat generation.

As described above, the lamination direction tensile strength is a value obtained by dividing a load at the time of fracture of a stacked body to which a tensile load is applied in the lamination direction by a cross-sectional area of a cross section perpendicular to the lamination direction D of the stacked body (adhesive bond area on one sheet surface of a sheet body included in the stacked body). For example, the lamination direction tensile strength may be a value obtained as follows. A tensile load is applied to a test specimen, as indicated by the broken line in FIG. 1, cut out from the laminated core 10 and having a uniform cross section (for example, a cuboid test specimen having a length along the lamination direction D of 45.0 mm×a width of 3.6 mm×a length of 12.25 mm) in the lamination direction D by a tension tester, and the maximum tensile load up to fracture of the test specimen is divided by the cross-sectional area of a cross section perpendicular to the lamination direction D of the test specimen to obtain the lamination direction tensile strength. As illustrated in FIG. 1, the test specimen is a stacked body including the electrical steel sheets 1 and the adhesive insulating coatings 2 that are stacked. The electrical steel sheets included in the test specimen are entirely bonded with the adhesive insulating coatings. The term "fracture" refers to fracture of at least one adhesive insulating coating among the adhesive insulating coatings formed between the sheet bodies included in the stacked body. As the tension tester, a tension tester is used that can perform a tensile test of a No. 5 test piece described in JIS Z 2241: 2022. As the tension tester, for example, a fully automatic tension tester having a tester capacity force of 100 kN is used.

The dimensions of the test specimen are not limited to the above, and the test specimen is cut out from the laminated core 10 so as to include two or more layers of the adhesive insulating coating 2 (three or more layers of the electrical steel sheet 1 as an adherend). The lamination direction of the test specimen and the cut-out position on a plane perpendicular to the lamination direction are not particularly limited. However, the test specimen is cut out from the laminated core 10 so as to include no protrusion 3. At this time, it is assumed that three or more of the electrical steel sheets 1 are stacked from the viewpoint of ease of performing a test and the frequency of stacking.

Thus, even at a relatively low temperature (60° C. or more and 200° C. or less), an adhesive bond strength required for a laminated core 10 for a motor to be a product (for example, 1 MPa) can be developed.

Therefore, the laminated core 10 having a high strength can be manufactured without further heating after the electrical steel sheets 1 are bonded to each other to form a stacked body (laminated core). Therefore, the laminated core 10 can be taken out in a low temperature state from a manufacturing apparatus, and the mechanism for high-temperature heating and cooling in the manufacturing apparatus can be simplified, such that the manufacturing apparatus of the laminated core 10 can be compact. Thus, it is possible to provide a laminated core 10 that can be manufactured with high production efficiency and a method for manufacturing the laminated core 10.

The electrical steel sheet 1 is, for example, suitable for a high-efficiency motor. The electrical steel sheet 1 may be, for example, a non-oriented electrical steel sheet having a yield point strength of 394 MPa, a low iron loss (13.0 W/kg or less), a high magnetic flux density, and a sheet thickness of 0.25 mm (for example, original standard 25HX1300).

The adhesive insulating coating 2 may be an adhesive with which the electrical steel sheet 1 is coated in advance before the punching step described below.

The surface of the electrical steel sheet may be coated with the adhesive insulating coating 2 having a film thickness of 3 μm, for example. The adhesive insulating coating 2 may be an adhesive resin containing a thermosetting resin as described below. The blending ratio of the thermosetting resin, an organic component other than the thermosetting resin, an inorganic component, and the like shown below is adjusted to set the lamination direction tensile strength measured under a condition of 25° C. to 20 MPa or more after the complete reaction.

Thermosetting Resin

Specific examples of thermosetting resin include crosslinked resins such as epoxy resins, thermosetting acrylic resins, urethane resins, unsaturated polyester resins, phenol resins, melamine resins, urea resins, and thermosetting polyimide resins. In the present invention, these resins can be used singly or in combination of two or more kinds thereof.
Epoxy Resin An epoxy resin is a resin containing two or more epoxy groups and is a resin that three-dimensionally cures by crosslinking of two or more epoxy groups present in the resin with an appropriate curing agent. Examples of the resin containing epoxy groups include bisphenol-based (bisphenol A type, bisphenol F type, or bisphenol AD type) epoxy resins, naphthalene-based epoxy resins, and epoxy resins having a cardo skeleton.
Thermosetting Acrylic Resin Examples of thermosetting acrylic resin include copolymers of an acrylic acid ester or a methacrylic acid ester and an acrylic monomer having a reactive functional group such as a hydroxyl group, an amino group, N-methylol, N-alkoxymethyl carboxide, an allyl group, or an epoxy group. Specific examples of the thermosetting acrylic resin include copolymers of methyl acrylate or methyl methacrylate and one or more of acrylic monomers having a reactive functional group, such as acrylic acid, methacrylic acid, acrylamide, N-methylol acrylamide, N-(methoxymethyl) acrylamide, allyl methacrylate, acrylic glycidyl ether, and glycidyl methacrylate. The thermosetting acrylic resin is crosslinked by utilizing the self-reactivity of the reactive functional group, or by a reaction between the reactive functional group and a curing agent such as an amine-based curing agent, and thus cures.

Urethane Resin

Examples of urethane resin include a resin including a polyfunctional isocyanate compound and a residue of a hydroxyl group-containing compound. Specific examples of urethane resin include a resin including an aromatic polyisocyanate such as tolylene diisocyanate, diphenylmethane isocyanate, or polymethylene polyphenylene polyisocyanate, an aliphatic polyisocyanate such as hexamethylene diisocyanate or xylene isocyanate, or a mixture thereof and including a residue of a hydroxyl group-containing compound such as polyether polyol, polyester polyol, polyacrylate polyol, or polycarbonate polyol. The urethane resin is crosslinked by a reaction with a curing agent such as an isocyanate-based curing agent or a polyol-based curing agent, and thus cures.

Unsaturated Polyester Resin

Examples of the unsaturated polyester resin include dehydration condensates of a compound obtained by substituting an unsaturated dibasic acid such as maleic anhydride, fumaric acid, or itaconic acid or a part of the unsaturated dibasic acid with a saturated dibasic acid such as phthalic anhydride, isophthalic acid, or terephthalic acid and a compound obtained by substituting a dihydric alcohol such as ethylene glycol, diethylene glycol, or propylene glycol or a part of the dihydric alcohol with a polyhydric alcohol such as glycerin or pentaerythritol. The unsaturated polyester resin is crosslinked by a reaction with a curing agent such as an isocyanate-based curing agent, and thus cures.

Other Thermosetting Resins

Examples of phenol resin include resins having two or more phenols (such as phenol and cresol) in a resin. The phenol resin is, for example, a resin including a residue of a phenol and a formaldehyde or an aldehyde. Specific examples of the phenol resin include phenol novolac resins, cresol novolac resins, cresol naphthol formaldehyde polycondensates, and triphenylmethane-type polyfunctional phenyl resins. Examples of the phenol resin include phenol aralkyl resins. Examples of the melamine resin include alkyl etherified melamine resins and substitutes thereof. Examples of the urea resin include ethylene urea resins. Examples of the thermosetting polyimide resin include a resin including a residue of a polycarboxylic dianhydride and a diamine compound. Specific examples of the thermosetting polyimide resin include maleimide-based polymers, bismaleimide-based polymers, aminobismaleimide-based polymers, and bismaleimidetriazine-based polymers. These resins also cure by a crosslinking reaction with a curing agent.

Preferred Example of Thermosetting Resin

Among the thermosetting resins described above, a thermosetting resin is preferable that contains one or more selected from the group consisting of epoxy resins, acrylic resins, urethane resins, and unsaturated polyester resins, from the viewpoint of many options for setting the glass transition temperature Tg to 30° C. or more, a rapid curing reaction at a high temperature, and ease of manufacturing a curing agent in a dispersion state. Among them, the thermosetting resin most preferably contains an epoxy resin, from the viewpoint of economic efficiency, versatility, and handleability.

Preferred Example of Adhesive Resin

One of preferred adhesive resins contains one or more thermosetting resins selected from the group consisting of epoxy resins, acrylic resins, urethane resins, and unsaturated polyester resins, and the total content of the one or more thermosetting resins (total mass of thermosetting resins/mass of adhesive resin×100(%)) is 20 mass % or more. If the adhesive resin contains these thermosetting resins at a content of 20 mass % or more, the properties of these thermosetting resins can be sufficiently utilized. Among such adhesive resins, an adhesive resin is most preferable that contains 50 mass % or more of an epoxy resin, from the viewpoint of economic efficiency, versatility, and handleability.

The adhesive resin contains a thermosetting resin and may contain only the thermosetting resin or may contain an organic or inorganic component other than the thermosetting resin. For example, the adhesive resin may contain a thermoplastic resin, an impact modifier such as core-shell rubber or natural rubber, a curing accelerator such as dimethylurea, boron trifluoride, or triphenylphosphine, a known modifier of an epoxy resin, a reaction control agent (catalyst or the like), a surfactant, a rust preventing agent, a lubricant, an antioxidant, an antifoaming agent, a coloring pigment, or the like.

Examples of Curing Agent

Specific examples of the curing agent include amine-based curing agents, amide-based curing agents, imidazole-based curing agents, acid anhydride-based curing agents, phenol-based curing agents, and catalyst-type curing agents. In the present invention, for example, crystalline curing agents that crystallize at room temperature can be selected singly or in combination of two or more kinds thereof from the following specific examples.

Amine-Based Curing Agent

Examples of an amine-based curing agent include, but are not limited to, aliphatic amines, aromatic amines, and guanidine compounds.

Aliphatic Amine

Examples of aliphatic amine include, but are not limited to, diethylenetriamine, triethylenetetraamine, tetraethylenepentamine, m-xylenediamine, trimethylhexamethylenediamine, 2-methylpentamethylenediamine, isophoronediamine, 1,3-bisaminomethylcyclohexane, bis(4-aminocyclohexyl)methane, norbornenediamine, 1,2-diaminocyclohexane, benzoylamine, methylcyclohexylamine, and diazabicycloundecene.

Aromatic Amine

Examples of aromatic amine include, but are not limited to, diaminodiphenylmethane, m-phenylenediamine, diaminodiphenylsulfone (DDS), diethyltoluenediamine, trimethylenebis(4-aminobenzoate), polytetramethyleneoxide-di-p-aminobenzoate, methylaniline, and dimethylaniline.

Guanidine Compound

Examples of the guanidine compound include, but are not limited to, dicyandiamide (DICY, cyanoguanidine) and its derivatives, methylguanidine, ethylguanidine, propylguanidine, butylguanidine, dimethylguanidine, trimethylguanidine, phenylguanidine, diphenylguanidine, and tolylguanidine.

Amide-Based Curing Agent

Examples of the amide-based curing agent include, but are not limited to, amine-based curing agents to which an acid anhydride is added and hydrazide-based compounds.

Hydrazide-Based Compound

Examples of hydrazide-based compounds include, but are not limited to, succinic dihydrazide, adipic dihydrazide, phthalic dihydrazide, isophthalic dihydrazide, terephthalic dihydrazide, p-oxybenzoic acid hydrazide, salicylic hydrazide, phenylaminopropionic acid hydrazide, and maleic acid dihydrazide.

Imidazole-Based Curing Agent

Examples of imidazole-based curing agent include imidazole-isocyanuric acid compounds, diamino-6-[2-(2-methyl-1-imidazolyl)ethyl]-1,3,5-triazine (2MZ-AZINE), 1-cyanoethyl-2-ethyl-4-methylimidazole (CEMI), 2-ethyl-4-methylimidazole, and 2-undecylimidazole (C11Z).

Acid Anhydride-Based Curing Agent

Examples of the acid anhydride-based curing agent include, but are not limited to, phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, and methylhexahydrophthalic anhydride.

Phenol-Based Curing Agent

Examples of the phenol-based curing agent include, but are not limited to, phenol novolac resins, cresol novolac resins, phenol aralkyl resins, cresol aralkyl resins, naphthol aralkyl resins, biphenyl-modified phenol resins, biphenyl-modified phenol aralkyl resins, dicyclopentadiene-modified phenol resins, aminotriazine-modified phenol resins, naphthol novolac resins, naphthol-phenol co-condensation novolac resins, naphthol-cresol co-condensation novolac resins, and allyl acrylic phenol resins.

Catalyst-Type Curing Agent

Examples of the catalyst-type curing agent include, but are not limited to, cationic thermosetting catalysts, BF3-amine complexes, and 1,8-diazabicyclo[5.4.0]undeca-7-ene.

The curing agent preferably contains one or more crystalline curing agents selected from the group consisting of amine-based curing agents, amide-based curing agents, and imidazole-based curing agents, because such a curing agent makes the curing reaction rate of an adhesive resin composition coating high during thermocompression bonding and thus the adhesive resin composition coating can relatively easily cure in a short time. Use of such a curing agent can make a difference between the temperature at which an adhesive resin composition-coated electrical steel sheet is stored and the heating temperature during thermocompression bonding, and thus facilitates control of the temperature rising rate during thermocompression bonding. From the viewpoint of handleability and versatility, the curing agent most preferably contains one or more selected from the group consisting of dicyandiamide (DICY), diaminodiphenylsulfone (DDS), and diamino-6-[2-(2-methyl-1-imidazolyl)ethyl]-1,3,5-triazine (2MZ-AZINE).

The laminated core 10 is formed by alternately stacking the electrical steel sheets 1 and the adhesive insulating coatings 2. The laminated core 10 includes, for example, 600 electrical steel sheets 1, and has a total thickness of about 150 mm.

Here, the uppermost layer in the electrical steel sheets 1 preferably has a protrusion 3 protruding in the lamination direction D. After formation of a first laminated core 10 in a die in the lamination direction D along the vertical direction, a second laminated core 10 is formed on the first laminated core 10 in the same die. Thus, when the lowermost layer in electrical steel sheets 1 of the second laminated core 10 is placed on the uppermost layer in electrical steel sheets 1 of the first laminated core 10 so that the lowermost layer and the uppermost layer are in direct contact with each other and then the second laminated core 10 is pressurized in the vertical direction, the lower surface of lowermost layer in the electrical steel sheets 1 of the second laminated core 10 is in contact with only the upper end of a protrusion 3 formed on the upper surface of the uppermost layer in the electrical steel sheets 1 of the first laminated core 10. Therefore, the adhesive bonding force at the contact section between the upper end of the protrusion 3 and the lower surface of the lowermost layer in the electrical steel sheets 1 of the second laminated core 10 can be made smaller than the weight of the first laminated core 10, which is lowermost. Therefore, when laminated cores 10 are sequentially mass-produced in the die, the first laminated core 10 naturally falls due to the action of gravity, so that the first laminated core 10 can be separated from the second laminated core 10 and easily taken out from the die alone. Thus, the laminated core 10 can be manufactured with high production efficiency.

The conditions for the natural fall and the separation of the first laminated core 10 from the second laminated core 10 by the action of gravity as described above are as follows.

For generation of the action, the number Q of protrusions 3 formed on the upper surface of the uppermost layer in the electrical steel sheets 1, the contact area $A$ ($m^2$) between the upper end of a protrusion 3 and the lower surface of the lowermost layer in the electrical steel sheets 1, the lamination direction tensile strength $\sigma$ ($N/m^2$) of the laminated core 10, and the weight $W$ (N) of the laminated core 10 have a relationship that can be expressed by an inequality $\sigma \times A \times Q < W$ for occurrence of the above-described action. At this time, the adhesive bond area may be calculated using either a measurement value of the size of the manufactured core or an area in design of the equipment, and a preferred value is used.

Second Embodiment

Next, a method for manufacturing a laminated core 10 will be described.

The method for manufacturing a laminated core 10 formed by stacking a plurality of electrical steel sheets 1 includes a punching step of punching an electrical steel sheet coated with an adhesive insulating coating 2 to form each of the plurality of electrical steel sheets 1, an accommodating step of stacking and accommodating the plurality of electrical steel sheets 1 in a die after the punching step, a low-pressure bonding step of heating the plurality of electrical steel sheets 1 in the die to a surface temperature of 60° C. or more and 200° C. or less while the plurality of electrical steel sheets 1 in the die are pressurized at 3.0 MPa or less and bonding the plurality of electrical steel sheets 1 adjacent to each other to form a laminated core, and a take-out step of taking out the laminated core 10 from the die after the low-pressure bonding step. Thus, the laminated core 10 can be integrally formed by pressurization under relatively low temperature and relatively low pressure conditions, and the lamination direction tensile strength that can be required for the laminated core 10 (for example, 1 MPa) can be ensured. Since the applied pressure is low, a special pressurizing device for pressurization at high pressure is not required. Since the temperature is low, natural cooling over time or promoting cooling by a special cooling device is not necessary, and the laminated core 10 can be taken out from the die at an early stage not depending on the cooling rate. Thus, it is possible to provide a method for manufacturing the laminated core 10 that can be manufactured with high production efficiency.

Hereinafter, each step will be described in detail.

(1) Preparation Step

An electrical steel sheet coated with an adhesive insulating coating 2 is prepared. Here, as the adhesive insulating coating 2, an adhesive resin is used such that the laminated core 10 can exhibit a lamination direction tensile strength of 20 MPa after the complete reaction. Thus, as described below, even when the laminated core 10 is formed by pressurization at a low temperature and a low pressure in the low-pressure bonding step, the laminated core 10 can have a lamination direction tensile strength of 1 MPa or more, which can be required for a laminated core 10 for a motor, at the time of being taken out in the take-out step.

(2) Punching Step

Next, the electrical steel sheet coated with the adhesive insulating coating 2 is punched to form an electrical steel sheet 1 (punching step).

Specifically, a hollow cylindrical die is installed with its central axis along the vertical direction. A punch having a shape according to the outer shape of the electrical steel sheet 1 is installed for punching above the die. An electrical steel sheet in a posture such that the sheet thickness direction of the electrical steel sheet 1 is in the vertical direction is moved in the horizontal direction toward the die and positioned between the upper side of the die and the lower side of the punch. The punch is lowered to act on the electrical steel sheet, and the electrical steel sheet is punched.

(3) Accommodating Step

Next, after the punching step, electrical steel sheets 1 are stacked and accommodated in the die (accommodating step).

Specifically, each electrical steel sheet 1 formed by punching in the punching step falls into the die and is accommodated in the die.

For punching of the next electrical steel sheet 1, an electrical steel sheet is moved in the horizontal direction. Then, the next electrical steel sheet 1 is punched in the punching step. The next electrical steel sheet 1 falls into the die and is accommodated in a state of overlaying the previous electrical steel sheet 1 in the die. These procedures are repeated to stack the electrical steel sheets 1 by the number required for forming a laminated core 10 in the die.

(4) Low-Pressure Bonding Step

Next, the electrical steel sheets 1 in the die are heated to a surface temperature (heating temperature) of 60° C. or more and 200° C. or less while pressurized at 3.0 MPa or less, and the adjacent electrical steel sheets 1 are bonded to each other to form a laminated core 10 (low-pressure bonding step). If the surface temperature is 200° C. or less, the electrical steel sheets 1 in the die can be heated without complicating or enlarging the equipment. Here, as the adhesive insulating coating 2 of the laminated core 10, an adhesive resin is used such that the laminated core 10 can exhibit a lamination direction tensile strength of 20 MPa after the complete reaction, and therefore the laminated core 10 can be integrally formed by pressurization under relatively low temperature and relatively low pressure conditions, and the lamination direction tensile strength that can be required for the laminated core 10 (for example, 1 MPa) can also be ensured. Since the pressure is low, a special pressurizing device for pressurization at high pressure is not required. Since the temperature is low, natural cooling over time or promoting cooling by a special cooling device is not necessary, and the laminated core 10 can be taken out from the die early. The heating temperature may be 150° C. or less, or 130° C. or less. The applied pressure may be, for example, 0.1 MPa or more, 0.5 MPa or more, or 1.0 MPa or more. The applied pressure may be 2.0 MPa or less, or 1.5 MPa or less. Pressurization is preferably performed in order to further reliably ensure the tensile adhesive bonding of the laminated core in the lamination direction, but may be not performed (in this case, the applied pressure is 0 MPa).

(4-1) Bonding Promotion Step

Here, in the low-pressure bonding step, the electrical steel sheets may be heated to a temperature of 100° C. or more and 160° C. or less (raised temperature) at a temperature rising rate of 0.5° C./s or more and 5.0° C./s or less, and the temperature may be held for a holding time of 20 seconds or more and 120 seconds or less (bonding promotion step). If the temperature rising rate is too low, bonding takes a long time, and cost competitiveness deteriorates. If the temperature rising rate is too high, equipment for achievement of the high temperature rising rate is required. Therefore, the temperature rising rate is preferably 0.5° C./s or more and 5.0° C./s or less. Thus, in the low-pressure bonding step, bonding between the adjacent electrical steel sheets 1 can be further promoted even during heating to 60° C. or more and 200° C. or less under low pressure and low temperature conditions. The raised temperature may be 150° C. or less, or 130° C. or less. The holding time may be 100 seconds or less, or 80 seconds or less. The temperature rising rate may be 4.0° C./s or less, or 3.0° C./s or less. The temperature at which the heating in the bonding promotion step is started is not limited, and may be, for example, a temperature lower than the raised temperature by 5° C. or more, or may be room temperature (20° C.).

The order of performing the heating to the heating temperature in the low-pressure bonding step and the heating and the holding in the bonding promotion step is not limited. For example, heating to the heating temperature in the low-pressure bonding step may be performed after performing the heating and the holding in the bonding promotion step, and the heating and the holding in the bonding promotion step may be performed in the middle of the heating to the heating temperature in the low-pressure bonding step (at least a part of the period from starting the heating to reaching the heating temperature).

The higher or lower temperature between the heating temperature in the low-pressure bonding step and the raised temperature in the bonding promotion step is not limited. For example, the raised temperature in the bonding promotion step may be equal to or less than the heating temperature in the low-pressure bonding step.

Furthermore, cooling may be performed in the middle of the heating to the heating temperature in the low-pressure bonding step or the raised temperature in the bonding promotion step, and the heating in the low-pressure bonding step and the heating in the bonding promotion step may be each performed twice or more. However, from the viewpoint of improving the manufacture efficiency, the heating in the low-pressure bonding step and the heating in the bonding promotion step are each preferably performed one time without performing cooling.

(5) Take-Out Step

Next, after the low-pressure bonding step, the laminated core 10 is taken out from the die (take-out step). At this time, the laminated core 10 at the time of being taken out has a lamination direction tensile strength of 1 MPa or more, which may be desired for a laminated core 10 for a motor.

Therefore, the step of promoting the adhesive bond strength of the adhesive insulating coating 2 by further heating is inessential.

Thus, the laminated core 10 can be manufactured with a simple apparatus, and the tact time and the manufacturing lead time can be shortened.

(6) Reheating Step

After the take-out step, the laminated core 10 may be heated to 160° C. or more and 250° C. or less (reheating step). Thus, the lamination direction tensile strength can be further increased according to the requirement for the laminated core 10. In a case where the adhesive insulating coating is completely reacted, the lamination direction tensile strength measured under a condition of 25° C. is 20 MPa or more in the lamination direction, so that the laminated core 10 can be obtained that has a higher lamination direction tensile strength than conventional laminated cores.

Other Embodiments

Although the embodiments have been described in detail with reference to the drawings, the specific constitution is not limited to those described above, and various design changes and the like can be made.

The protrusion 3 may be formed, for example, with the following method. For example, the protrusion 3 may be formed with a method of forming a protrusion with a punch without punching by press working.

A laminated core 10 according to the present embodiment includes electrical steel sheets 1 and adhesive insulating coatings 2 that are alternately stacked and has a lamination direction tensile strength of 20 MPa or more, and the lamination direction tensile strength is measured under a condition of 25° C. after a complete reaction of each of the adhesive insulating coatings 2. Thus, even at a relatively low temperature (60° C. or more and 200° C. or less), an adhesive bond strength required for a laminated core 10 for a motor to be a product (for example, 1 MPa) can be developed. Therefore, the laminated core 10 having a high strength can be manufactured without further heating after the electrical steel sheets 1 are bonded to each other to form a stacked body (laminated core). Therefore, the laminated core 10 can be taken out in a low temperature state from a manufacturing apparatus, and the mechanism for high-temperature heating and cooling in the manufacturing apparatus can be simplified, such that that the manufacturing apparatus of the laminated core 10 can be compact. Thus, the laminated core 10 can be manufactured with high production efficiency.

A method for manufacturing a laminated core 10 according to the present embodiment is a method for manufacturing a laminated core 10 formed by stacking a plurality of electrical steel sheets 1. The method for manufacturing a laminated core 10 includes a punching step of punching an electrical steel sheet coated with an adhesive insulating coating 2 to form an electrical steel sheet 1, an accommodating step of stacking and accommodating electrical steel sheets 1 in a die after the punching step, a low-pressure bonding step of heating the electrical steel sheets 1 in the die at a surface temperature of 60° C. or more and 200° C. or less while the electrical steel sheets 1 in the die are pressurized at 3.0 MPa or less and bonding the adjacent electrical steel sheets 1 to each other to form a laminated core, and a take-out step of taking out the laminated core 10 from the die after the low-pressure bonding step. Thus, the laminated core 10 can be integrally formed by pressurization under relatively low temperature and relatively low pressure conditions, and the lamination direction tensile strength that can be required for the laminated core 10 (for example, 1 MPa) can be ensured. Since the applied pressure is low, a special pressurizing device for pressurization at high pressure is not required. Since the temperature is low, natural cooling over time or promoting cooling by a special cooling device is not necessary, and the laminated core 10 can be taken out from the die early. Thus, it is possible to provide a method for manufacturing the laminated core 10 that can be manufactured with high production efficiency.

EXAMPLES

Lamination Direction Tensile Strength Test

Laminated cores manufactured under different conditions were subjected to a test for measurement of the lamination direction tensile strength. In this test, a fully automatic metal tension tester manufactured by SHIMADZU CORPORATION was used.

FIG. 4 is a table showing a relationship among test specimens, test conditions, and test results in the tensile test of adhesive bond.

In FIG. 4, in order from the left column, "No." indicates the number of a test specimen, "Example or Comparative Example" indicates whether a case is Example or Comparative Example, "Heating temperature" indicates the temperature by ° C. at which a plurality of electrical steel sheets stacked in the low-pressure bonding step are heated in the process of forming a laminated core, "Applied pressure" indicates the pressure by MPa at which a plurality of electrical steel sheets stacked in the low-pressure bonding step are pressurized in the process of forming a laminated core, "Temperature rising rate" indicates the rate by ° C./s of heating from the heating start temperature (room temperature (20° C.)) to the raised temperature in the bonding promotion step, "Temperature rising amount" indicates the temperature range in temperature rising by ° C. from the heating start temperature (room temperature (20° C.)) to the raised temperature (maximum attainment temperature) (=raised temperature (° C.)–20 (° C.)) in the bonding promotion step, "Holding time" indicates the holding time by second of holding a temperature of 60° C. or more and 120° C. or less, which is the raised temperature, "Reheating temperature" indicates the temperature reached in reheating after take-out from a die, and "90° C. Lamination direction tensile strength" indicates "B" in a case where a manufactured laminated core has a lamination direction tensile strength of 1 MPa or more at 90° C., "A" in a case where a manufactured laminated core has a lamination direction tensile strength of 3 MPa or more at 90° C., and "C" in a case where the lamination direction tensile strength is less than 1 MPa. In all of the test conditions, the heating temperature in the low-pressure bonding step was the same as the raised temperature in the bonding promotion step.

The contents of the test were as follows.

Each laminated core was a stator core used as a stator for a motor.

Each electrical steel sheet used for manufacturing a laminated core was 25HX1300 (a non-oriented electrical steel sheet having a sheet thickness of 0.25 mm, a low iron loss, and a high magnetic flux density).

Each laminated core included 600 electrical steel sheets stacked.

Each laminated core had a lamination thickness (length along the lamination direction D) of 150 mm.

Each laminated core was formed by heating a plurality of electrical steel sheets stacked in a die from room temperature (20° C.) as the heating start temperature to a predetermined surface temperature (heating temperature shown in FIG. 4=raised temperature) at a predetermined temperature rising rate shown in FIG. 4 while the plurality of electrical steel sheets were pressurized at a predetermined applied pressure shown in FIG. 4, and holding the temperature for a predetermined time shown in FIG. 4.

Each test specimen was cut out in a cuboid shape from a laminated core, as indicated by the broken line in FIG. 1. Each test specimen had dimensions of a length along the lamination direction D of 45.0 mm×a width of 3.6 mm×a length of 12.25 mm.

The value of the 90° C. lamination direction tensile strength was obtained by dividing the maximum load during gradually increasing the tensile load of pulling a test specimen heated to 90° C. in the longitudinal direction in a state where both ends of the test specimen in the longitudinal direction were held with a chuck of a tension tester by the cross-sectional area of the test specimen. The electrical steel sheets included in the test specimen were entirely bonded with the adhesive insulating coatings.

Each adhesive insulating coating (adhesive coat) used was an adhesive resin having a lamination direction tensile strength of 20 MPa or more at 25° C. after the complete reaction or an adhesive resin having a lamination direction tensile strength of 14 MPa under the same conditions. The lamination direction tensile strength at 25° C. after the complete reaction of an adhesive resin was measured in advance in the same manner as in the measurement of the 90° C. lamination direction tensile strength.

Specifically, in the examples of Nos. 1, 4, 5, 8, 9, and 11 to 18, thermosetting resins used were 44 parts by mass of a phenol novolak-type epoxy resin (PPN201 manufactured by Nippon Kayaku Co., Ltd.), 12 parts by mass of a cresol novolak-type epoxy resin (YDCN-700-10 manufactured by NIPPON STEEL Chemical & Material CO., LTD.), 10 parts by mass of a trifunctional epoxy resin (EP-3950E manufactured by ADEKA CORPORATION), 30 parts by mass of a tetrafunctional epoxy resin (YH-404 manufactured by NIPPON STEEL Chemical & Material CO., LTD.), and 4 parts by mass of a bisphenol A-type epoxy resin (Epikote manufactured by Mitsubishi Chemical Corporation), thermoplastic resins used were 40 parts by mass of a phenoxy resin (YPS-007A30 manufactured by NIPPON STEEL Chemical & Material CO., LTD.) (based on a thermosetting resin) and 10 parts by mass of core-shell rubber (based on a thermosetting resin), and a curing agent used was 12 parts by mass of DICY (based on a thermosetting resin). The adhesive resin had a lamination direction tensile strength of 24 MPa at 25° C. after the complete reaction.

In the example of No. 2, thermosetting resins used were 44 parts by mass of a phenol novolak-type epoxy resin (PPN201 manufactured by Nippon Kayaku Co., Ltd.), 12 parts by mass of a cresol novolak-type epoxy resin (YDCN-700-10 manufactured by NIPPON STEEL Chemical & Material CO., LTD.), 10 parts by mass of a trifunctional epoxy resin (EP-3950E manufactured by ADEKA CORPORATION), 30 parts by mass of a tetrafunctional epoxy resin (YH-404 manufactured by NIPPON STEEL Chemical & Material CO., LTD.), and 4 parts by mass of a bisphenol A-type epoxy resin (Epikote manufactured by Mitsubishi Chemical Corporation), thermoplastic resins used were 40 parts by mass of a phenoxy resin (YPS-007A30 manufactured by NIPPON STEEL Chemical & Material CO., LTD.) (based on a thermosetting resin) and 10 parts by mass of core-shell rubber (based on a thermosetting resin), and curing agents used were 41 parts by mass of DDS and 2 parts by mass of DCMU (based on a thermosetting resin). The adhesive resin had a lamination direction tensile strength of 83 MPa at 25° C. after the complete reaction.

In the examples of No. 3, 6, and 10, thermosetting resins used were 56 parts by mass of a phenol novolak-type epoxy resin (PPN201 manufactured by Nippon Kayaku Co., Ltd.) and 44 parts by mass of a tetrafunctional epoxy resin (YH-404 manufactured by NIPPON STEEL Chemical & Material CO., LTD.), thermoplastic resins used were 33 parts by mass of a phenoxy resin (YP-50 manufactured by NIPPON STEEL Chemical & Material CO., LTD.) (based on a thermosetting resin) and 5 parts by mass of core-shell rubber (based on a thermosetting resin), and curing agents used were 12 parts by mass of DICY and 5 parts by mass of DCMU (based on a thermosetting resin). The adhesive resin had a lamination direction tensile strength of 14 MPa at 25° C. after the complete reaction.

The heating temperature (surface temperature) was selected from 200° C., 120° C., and 60° C. and combined with other conditions.

The applied pressure was selected from 1.0 MPa, 0 MPa, and 3.0 MPa and combined with other conditions.

The temperature rising rate was selected from 3° C./s, 5° C./s, 0.15° C./s, 10° C./s, and 0.1° C./s and combined with other conditions.

The temperature rising amount, which is the temperature range in temperature rising from room temperature (20° C.) to the raised temperature (=heating temperature), was selected from 100° C., 40° C., and 180° C. and combined with other conditions.

The holding time of holding a temperature of 60° C. or more and 200° C. or less, which is the raised temperature, was selected from 20 seconds, 0 seconds, 120 seconds, and 200 seconds and combined with other conditions.

The reheating temperature, which is the temperature reached in reheating after take-out from a die, was selected from no reheating, 160° C., and 250° C. and combined with other conditions.

The lamination direction tensile strength was tested, and in a case where the lamination direction tensile strength was 1 MPa or more, the result was regarded as a pass, and in a case where the lamination direction tensile strength was less than 1 MPa, the result was regarded as a failure. FIG. 4 indicates "A" or "B" in the case of a pass, and "C" in the case of a failure.

As shown in FIG. 4, the test result was a pass in Nos. 1, 2, 4, 5, 8, 9, and 11 to 18, which were Examples, and was a failure in Nos. 3, 6, and 10, which were Comparative Examples As described above, it was confirmed that in a case where the lamination direction tensile strength in the lamination direction D measured at 25° C. was 20 MPa or more after the complete reaction of the adhesive insulating coating 2, a lamination direction tensile strength of 1 MPa or more was ensured at the time of take-out from the die (90° C.) even if pressurization in the die was performed at a low temperature and a low pressure. Furthermore, each laminated core in Examples had a lamination direction tensile strength of 20 MPa or more under a condition of 25° C. after the complete reaction of the adhesive insulating coating, and thus a laminated core was obtained that had a higher lamination direction tensile strength than conventional laminated cores. A test specimen was cut out from the laminated core manufactured in some Examples and used for measurement, and thus the lamination direction tensile strength was confirmed to be 20 MPa or more at 25° C.

REFERENCE SIGNS LIST

1 Electrical steel sheet
2 Adhesive insulating coating
3 Protrusion
10 Laminated core
D Lamination direction

The invention claimed is:

1. A laminated core comprising electrical steel sheets and adhesive insulating coatings that are alternately stacked,
the laminated core having a tensile strength of adhesive bond in a lamination direction of 20 MPa or more, the tensile strength of adhesive bond measured under a condition of 25° C. after a complete reaction of each of the adhesive insulating coatings.

2. The laminated core according to claim 1, wherein an uppermost layer in the electrical steel sheets has a protrusion protruding in the lamination direction.

3. A method for manufacturing a laminated core according to claim 1 formed by stacking a plurality of electrical steel sheets, the method comprising:
a punching step of punching an electrical steel sheet coated with an adhesive insulating coating to form each of the plurality of electrical steel sheets;
an accommodating step of stacking and accommodating the plurality of electrical steel sheets in a die after the punching step;
a low-pressure bonding step of heating the plurality of electrical steel sheets in the die to a surface temperature of 60° C. or more and 200° C. or less while the plurality of electrical steel sheets in the die are pressurized at 3.0 MPa or less and bonding the plurality of electrical steel sheets adjacent to each other to form a laminated core; and
a take-out step of taking out the laminated core from the die after the low-pressure bonding step.

4. The method for manufacturing a laminated core according to claim 3, wherein
the low-pressure bonding step includes a bonding promotion step of heating the plurality of electrical steel sheets to a temperature of 100° C. or more and 160° C. or less at a temperature rising rate of 0.5° C./s or more and 5.0° C./s or less and holding the temperature for a holding time of 20 seconds or more and 120 seconds or less.

5. The method for manufacturing a laminated core according to claim 3, comprising a reheating step of heating the laminated core to 160° C. or more and 250° C. or less after the take-out step.

6. The method for manufacturing a laminated core according to claim 4, comprising a reheating step of heating the laminated core to 160° C. or more and 250° C. or less after the take-out step.

7. The method for manufacturing a laminated core according to claim 3, wherein
in the low-pressure bonding step, the plurality of electrical steel sheets in the die are pressurized at 0.1 MPa or more.

8. The method for manufacturing a laminated core according to claim 4, wherein
in the low-pressure bonding step, the plurality of electrical steel sheets in the die are pressurized at 0.1 MPa or more.

* * * * *